(12) United States Patent
Taki et al.

(10) Patent No.: US 11,518,435 B2
(45) Date of Patent: Dec. 6, 2022

(54) MOTOR CONTROL APPARATUS AND MOTOR DRIVING SYSTEM

(71) Applicant: DENSO CORPORATION, Kariya (JP)

(72) Inventors: Masaya Taki, Kariya (JP); Koichi Nakamura, Kariya (JP); Toshimitsu Sakai, Kariya (JP); Nobuyori Nakajima, Kariya (JP)

(73) Assignee: DENSO CORPORATION, Kariya (JP)

( * ) Notice: Subject to any disclaimer, the term of this patent is extended or adjusted under 35 U.S.C. 154(b) by 943 days.

(21) Appl. No.: 16/296,851

(22) Filed: Mar. 8, 2019

(65) Prior Publication Data

US 2019/0283800 A1    Sep. 19, 2019

(30) Foreign Application Priority Data

Mar. 15, 2018    (JP) .............................. JP2018-048201

(51) Int. Cl.
| | |
|---|---|
| *H02K 3/28* | (2006.01) |
| *B62D 6/10* | (2006.01) |
| *B62D 5/04* | (2006.01) |
| *H02P 5/685* | (2006.01) |
| *H02P 5/60* | (2006.01) |
| *H02P 4/00* | (2006.01) |

(52) U.S. Cl.
CPC .............. *B62D 6/10* (2013.01); *B62D 5/0406* (2013.01); *H02P 4/00* (2013.01); *H02P 5/60* (2013.01); *H02P 5/685* (2013.01)

(58) Field of Classification Search
CPC ........... B62D 5/0406; B62D 6/10; H02P 4/00; H02P 5/60; H02P 5/685; H02P 5/74
See application file for complete search history.

(56) References Cited

U.S. PATENT DOCUMENTS

2013/0200827 A1* 8/2013 Kezobo ............... B62D 5/0487
                                                318/400.21
2014/0163923 A1* 6/2014 Takaki .................... G01B 7/30
                                                702/151

(Continued)

FOREIGN PATENT DOCUMENTS

| JP | 2017-184388 A | 10/2017 |
| WO | WO 2016/135840 A1 | 4/2017 |
| WO | WO 2018/012419 A1 | 1/2018 |

OTHER PUBLICATIONS

U.S. Appl. No. 16/243,519; filed Jan. 9, 2019 and its entire file history, filed Jan. 9, 2019, Sakai, et al.

*Primary Examiner* — Muhammad S Islam
(74) *Attorney, Agent, or Firm* — Maschoff Brennan

(57) ABSTRACT

An ECU includes a plurality of motor driving circuits for driving at least one motor, a plurality of computers and a plurality of clock circuits. A first computer, which is at a synchronization signal transmission-side, transmits a synchronization signal to a second computer, which is at a synchronization signal reception-side. The first computer and the second computer execute a plurality of specific periodic processes, which are processes executed at cycle periods (for example, 200 μs, 400 μs) of different natural number multiples of a cycle period (for example, 200 μs) of the synchronization signal and need be synchronized. Each timing of the plurality of specific periodic processes is determined based on one synchronization signal.

18 Claims, 14 Drawing Sheets

(56) References Cited

U.S. PATENT DOCUMENTS

| | | | |
|---|---|---|---|
| 2017/0237377 A1* | 8/2017 | Furukawa | H02P 29/028 |
| | | | 318/564 |
| 2019/0013748 A1* | 1/2019 | Barrenscheen | H02P 6/10 |
| 2019/0144028 A1* | 5/2019 | Taki | B60R 16/02 |
| | | | 701/41 |
| 2019/0144030 A1* | 5/2019 | Sakai | B62D 5/0481 |
| | | | 318/3 |
| 2019/0283800 A1* | 9/2019 | Taki | B62D 6/10 |

* cited by examiner

MOTOR CONTROL APPARATUS AND MOTOR DRIVING SYSTEM

CROSS REFERENCE TO RELATED APPLICATION

The present application is based on Japanese patent application No. 2018-48201 filed on Mar. 15, 2018, the whole contents of which are incorporated herein by reference.

BACKGROUND

The present disclosure relates to a motor control apparatus for controlling driving of a motor by a plurality of computers, and a motor drive system including the motor control apparatus.

Conventionally, in a motor control apparatus that controls driving of a motor with a plurality of computers, each computer synchronously executes a plurality of periodic processes having different processing cycle periods.

SUMMARY

The present disclosure provides a motor control apparatus, which comprises a plurality of motor driving circuits for driving at least one motor, a plurality of computers and a plurality of clock generation circuits. Each computer includes a driving signal generation section, which generates a motor driving signal and outputs a command to each motor driving circuit, and a driving timing generation section, which generates a driving timing as a pulse timing of the motor driving signal. The plurality of clock generation circuits independently generates clocks serving as references for operations of the plurality of computers. At least one of the plurality of computers is set as a transmission-side computer, which operates in synchronization with the driving timing thereof and generates and transmits a synchronization signal for synchronizing driving timings of the plurality of computers. At least another one of the plurality of computers is set as a reception-side computer, which receives the synchronization signal transmitted from the transmission-side computer. The transmission-side computer and the reception-side computer execute a plurality of specific periodic processes, which are to be executed at cycle periods of different natural number multiples of a cycle period of the synchronization signal and need be synchronized. Each timing of the plurality of specific periodic processes is determined based on the synchronization signal.

DETAILED DESCRIPTION OF EMBODIMENTS

Figure 1:
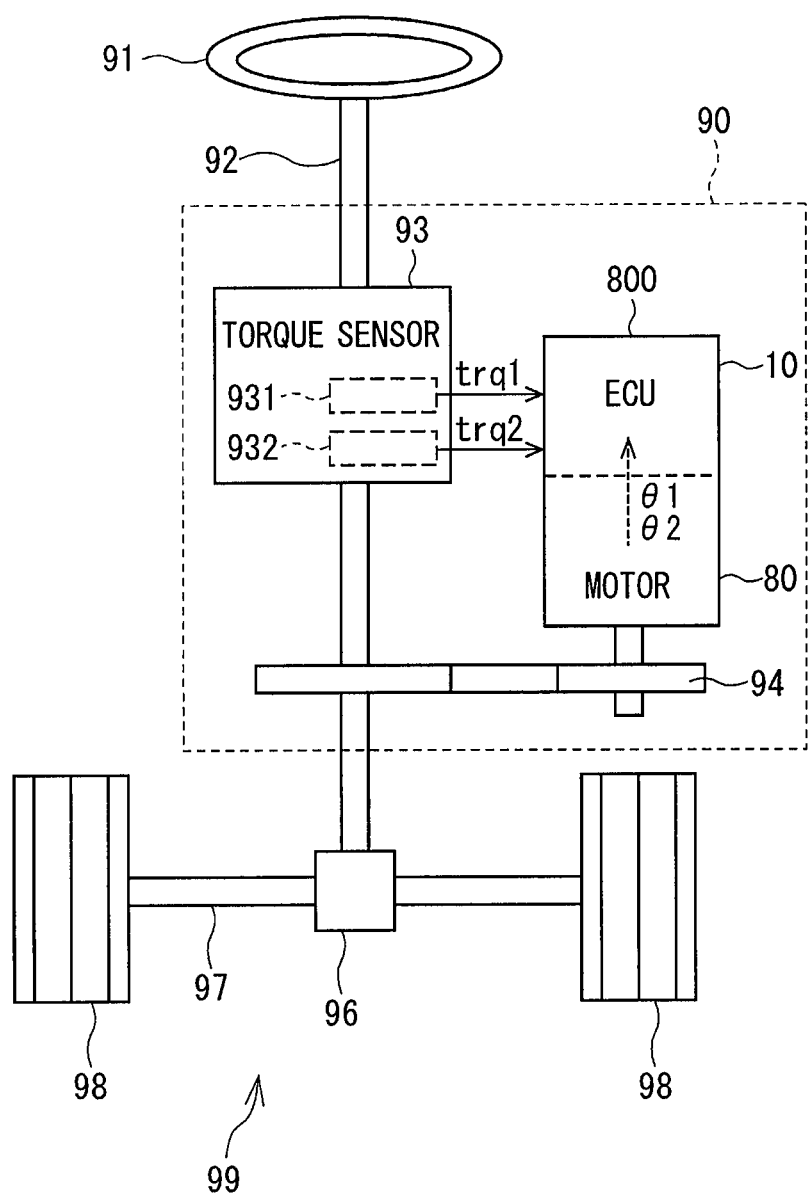
FIG. 1 is a schematic diagram of an electric power steering apparatus including an ECU which is used as a motor driving system of a machine-electronics integrated type.

A motor control apparatus will be described with reference to plural embodiments shown in the accompanying drawings. In each embodiment, an ECU (electronic control unit) which is provided as a motor control apparatus and applied to an electric power steering apparatus of a vehicle is configured to control power supply to a motor for outputting a steering assist torque. The ECU and the motor form a motor driving system. In the following embodiments, substantially same structural and functional parts are designated with the same reference numerals thereby to simplify the description. The following first and second embodiments are collectively referred to as a present embodiment.

Figure 2:
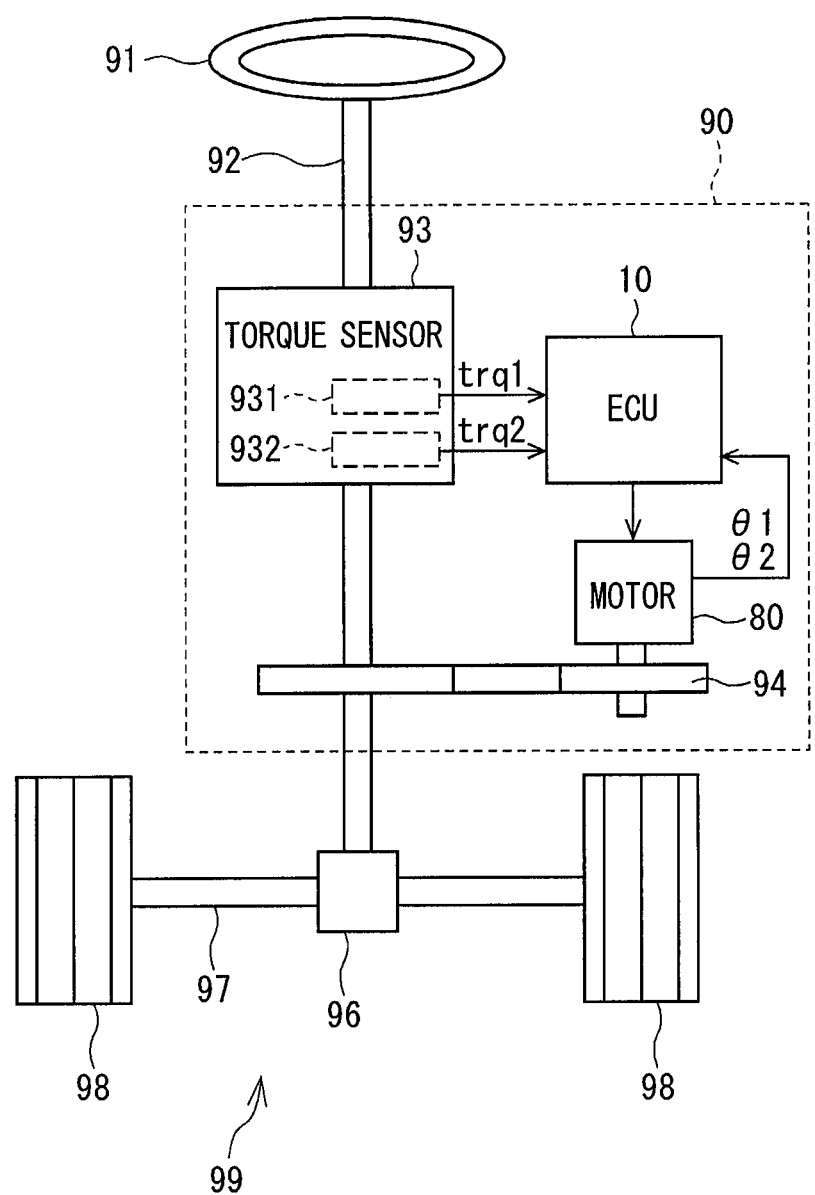
FIG. 2 is a schematic diagram of an electric power steering apparatus including an ECU which is used as a motor driving system of a machine-electronics separated type.

First, a common configuration of an electric power steering apparatus, a motor driving system and the like in each embodiment will be described with reference to FIG. 1 to FIG. 6. FIG. 1 and FIG. 2 show an overall configuration of a steering system 99 including an electric power steering apparatus 90. FIG. 1 shows a configuration of a machine-electronics integrated type in which an ECU 10 is integrally formed on one side in the axial direction of the motor 80. FIG. 2 shows a configuration of a machine-electronics separated type in which the ECU 10 and the motor 80 are physically separated and electrically connected via a harness. Although the electric power steering apparatus 90 shown in FIG. 1 and FIG. 2 is a column assist type, it may be configured to be a rack assist type.

The steering system 99 includes a steering wheel 91, a steering shaft 92, a pinion gear 96, a rack shaft 97, road wheels 98, the electric power steering apparatus 90 and the like. The steering shaft 92 is coupled to the steering wheel 91. The pinion gear 96 provided at an axial end of the steering shaft 92 engages with the rack shaft 97. The road wheels 98 are provided at both lateral ends of the rack shaft 97 via, for example, tie rods. When a driver rotates the steering wheel 91, the steering shaft 92 coupled to the steering wheel 91 rotates. Rotational motion of the steering shaft 92 is converted into linear motion of the rack shaft 97 by the pinion gear 96 and the road wheels 98 are steered to an angle corresponding to a displacement amount of the rack shaft 97.

The electric power steering apparatus 90 includes a steering torque sensor 93, the ECU 10, the motor 80, a reduction gear 94 and the like. The steering torque sensor 93 is provided at an intermediate portion of the steering shaft 92 to detect a steering torque applied by the driver. In the embodiment shown in FIG. 1 and FIG. 2, the steering torque sensor 93 is a dual type, which includes a first torque sensor 931 and a second torque sensor 932, and detects a first steering torque trq1 and a second steering torque trq2 in a dual manner, respectively. In case that the steering torque sensors are not provided redundantly, a detected value of one steering torque trq may be used in common for the dual systems. Hereinafter, where the steering torques trq1 and trq2 are redundantly detected but not essential, the two torques trq1 and trq2 are referred to simply as a steering torque trq.

Based on the steering torques trq1 and trq2, the ECU 10 controls driving of the motor 80 so that the motor 80 generates a desired assist torque for assisting a steering operation. The assist torque generated by the motor 8 is transmitted to the steering shaft 92 via the reduction gear 94. The ECU 10 acquires electrical angles 81, 82 of the motor 80 detected by the rotation angle sensor and the steering torques trq1, trq2 detected by the steering torque sensor 93. The ECU 10 controls driving of the motor 80 based on such detected information and other information such as a motor current, which is detected inside the ECU 10.

Figure 3:
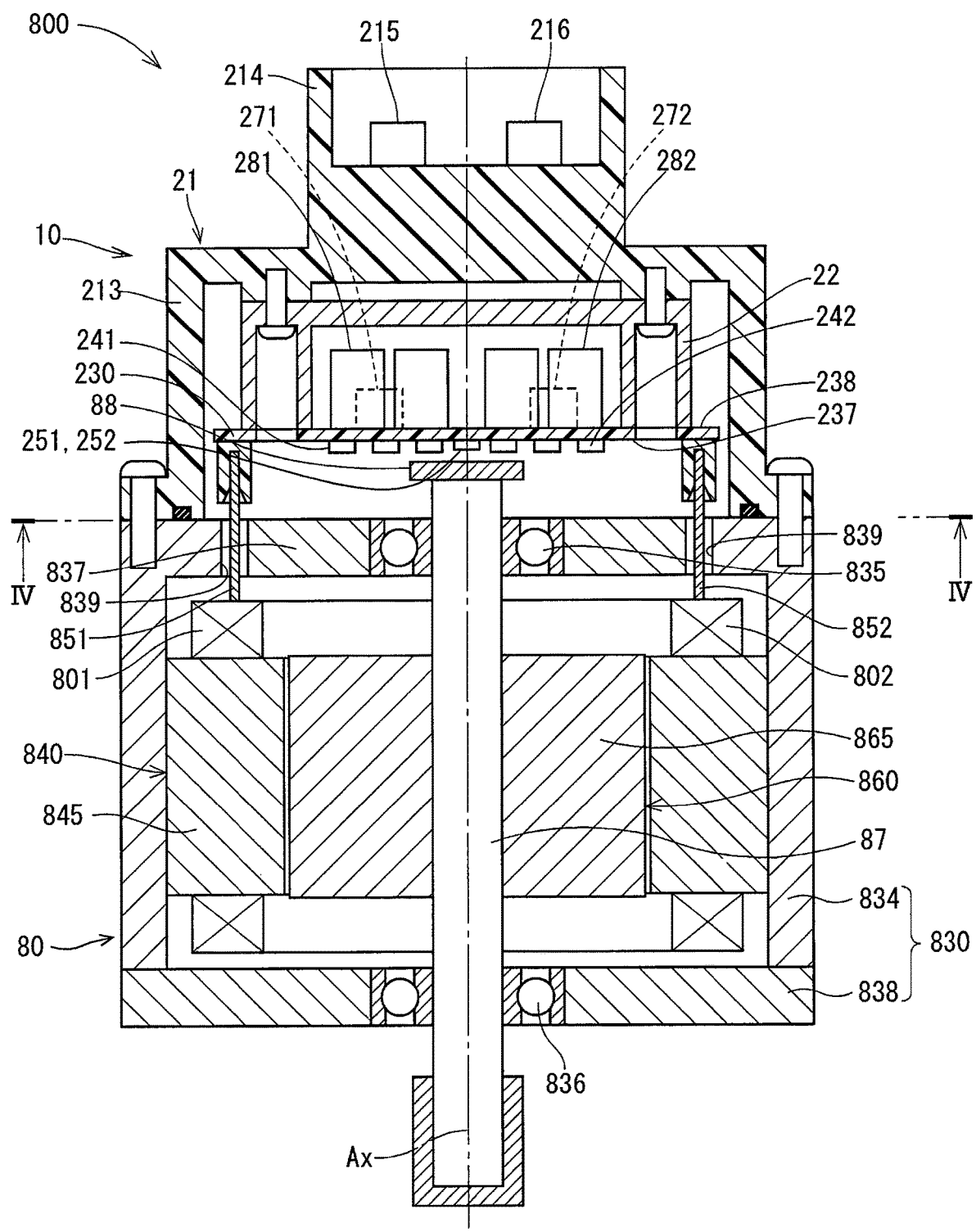
FIG. 3 is an axial cross-sectional view of a dual electro-mechanically-integrated motor.
Figure 4:
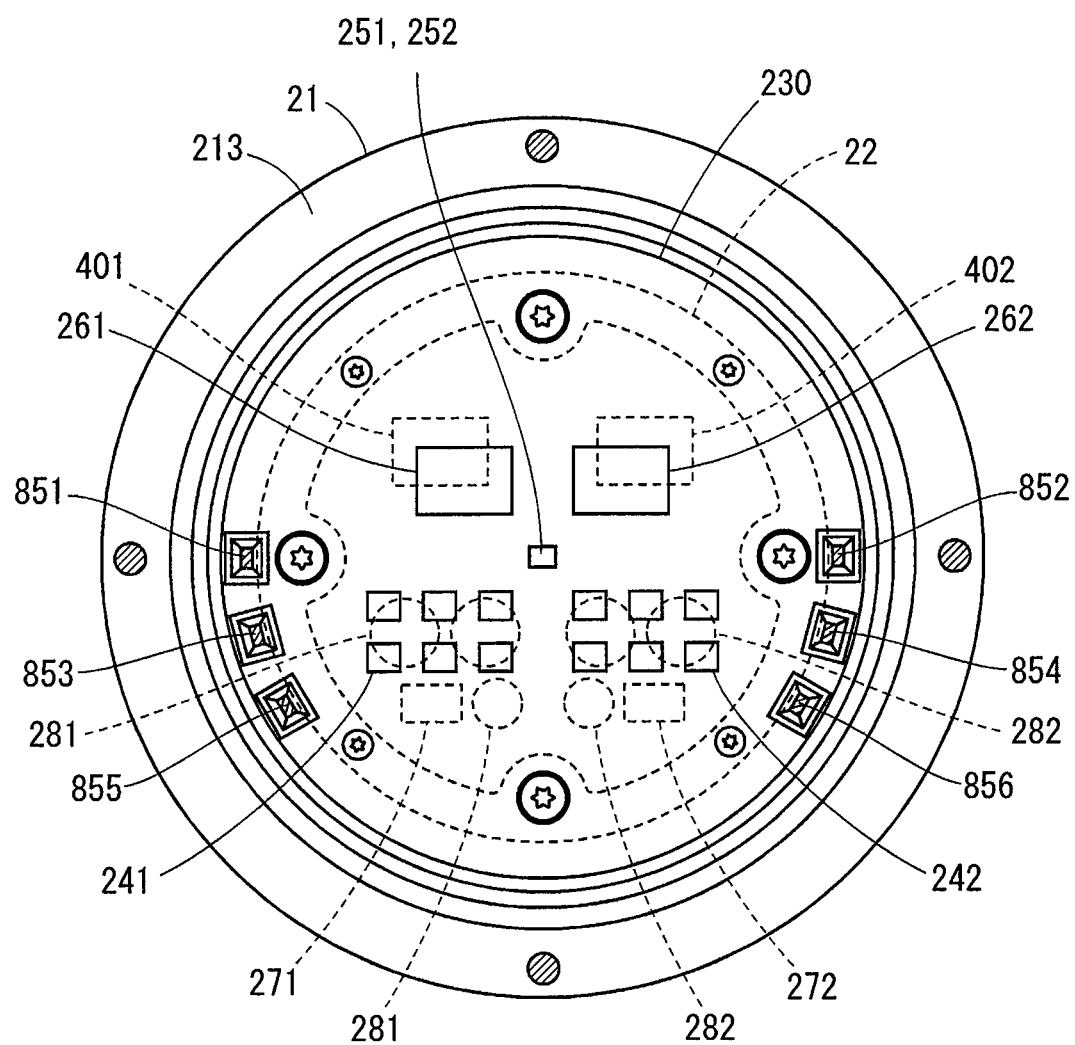
FIG. 4 is a cross-sectional view taken along a line IV-IV in FIG. 3.

A configuration of the motor 80 of the machine-electronics integrated type in which the ECU 10 is integrally formed on one side in the axial direction of the motor 80 will be described with reference to FIG. 3 and FIG. 4. The ECU 10 is positioned coaxially with an axis Ax of a shaft 87 on the side opposite to an output shaft of the motor 80. As another embodiment, the ECU 10 may be configured integrally with the motor 80 on the output side of the motor 80. The motor 80 is a three-phase brushless motor which includes a stator 840, a rotor 860 and a housing 830 which houses them.

The stator 840 has a stator core 845 fixed to the housing 830 and two three-phase first and second winding sets 801, 802 assembled to the stator core 845. Lead wires 851, 853 and 855 extend from each phase winding forming the first winding set 801. Lead wires 852, 854 and 856 extend from each phase winding forming the second winding set 802. The rotor 860 has the shaft 87, which is supported by a rear bearing 835 and a front bearing 836, and a rotor core 865, into which the shaft 87 is fitted. The rotor 860 is provided radially inside the stator 840 to be rotatable relative to the stator 840. A permanent magnet 88 is provided at one end of the shaft 87.

The housing 830 has a bottomed cylindrical case 834, which has a rear end frame 837, and a front end frame 838, which is provided on an open end side of the case 834. The case 834 and the front end frame 838 are fastened to each other by bolts or the like. The lead wires 851, 852 and the like of each winding set 801, 802 are passed through lead wire insertion holes 839 of the rear end frame 837 to extend in the axial direction to the ECU 10 side and are connected to a circuit board 230.

The ECU 10 includes a cover 21, a heat sink 22 fixed to the cover 21, the circuit board 230 fixed to the heat sink 22 and other electronic components mounted on the circuit board 230. The cover 21 is provided to protect the electronic components from external impacts and to prevent dust and water from entering into the ECU 10. The cover 21 is formed of a cover portion 213 and an external connection connector portion 214 for connection with external power supply cables and signal cables. Power supply terminals 215 and 216 of the external connection connector portion 214 are connected to the circuit board 230, although not shown.

The circuit board 230 is, for example, a printed circuit board and is positioned to face the rear end frame 837 and fixed to the heat sink 22. On the circuit board 230, electronic components of the first and second system groups are mounted independently for each system so that the two systems are provided in a fully redundant configuration. In the present embodiment, the circuit board 230 is provided singly but, as another embodiment, two or more circuit boards may be provided. Of two main surfaces of the circuit board 230, a surface facing the rear end frame 837 is referred to as a motor-side surface 237 and a surface opposite to the motor-side surface 237, that is, a surface facing the heat sink 22 is referred to as a cover-side surface 238.

On the motor-side surface 237, a plurality of switching elements 241, 242, rotation angle sensors 251, 252, custom ICs 261, 262 and the like are mounted. In the present embodiment, there are six switching elements 241, 242 for each system and form upper and lower arms of three phases of motor driving circuits, which will be described later with reference to FIG. 5 to FIG. 7. The rotation angle sensors 251 and 252 are positioned to face the permanent magnet 88 provided at the axial end of the shaft 87. The custom ICs 261, 262 and computers 401, 402 are provided as control circuits of the ECU 10. The computers 401 and 402 are microcomputers, which will be described later. In the custom ICs 261 and 262, for example, clock monitor circuits 661 and 662 and the like shown in FIG. 6 are provided, respectively.

On the cover-side surface 238, the computers 401, 402, capacitors 281, 282, inductors 271, 272 and the like are mounted. In particular, the first computer 401 and the second computer 402 are positioned on the same cover-side surface 238 of the same circuit board 230 with a predetermined distance therebetween. The capacitors 281 and 282 smoothen an input power supplied from power supply batteries and prevent noise generated and flowing out due to the switching operation or the like of the switching elements 241 and 242, respectively. The inductors 271 and 272 form filter circuits together with the capacitors 281 and 282, respectively.

Figure 5:
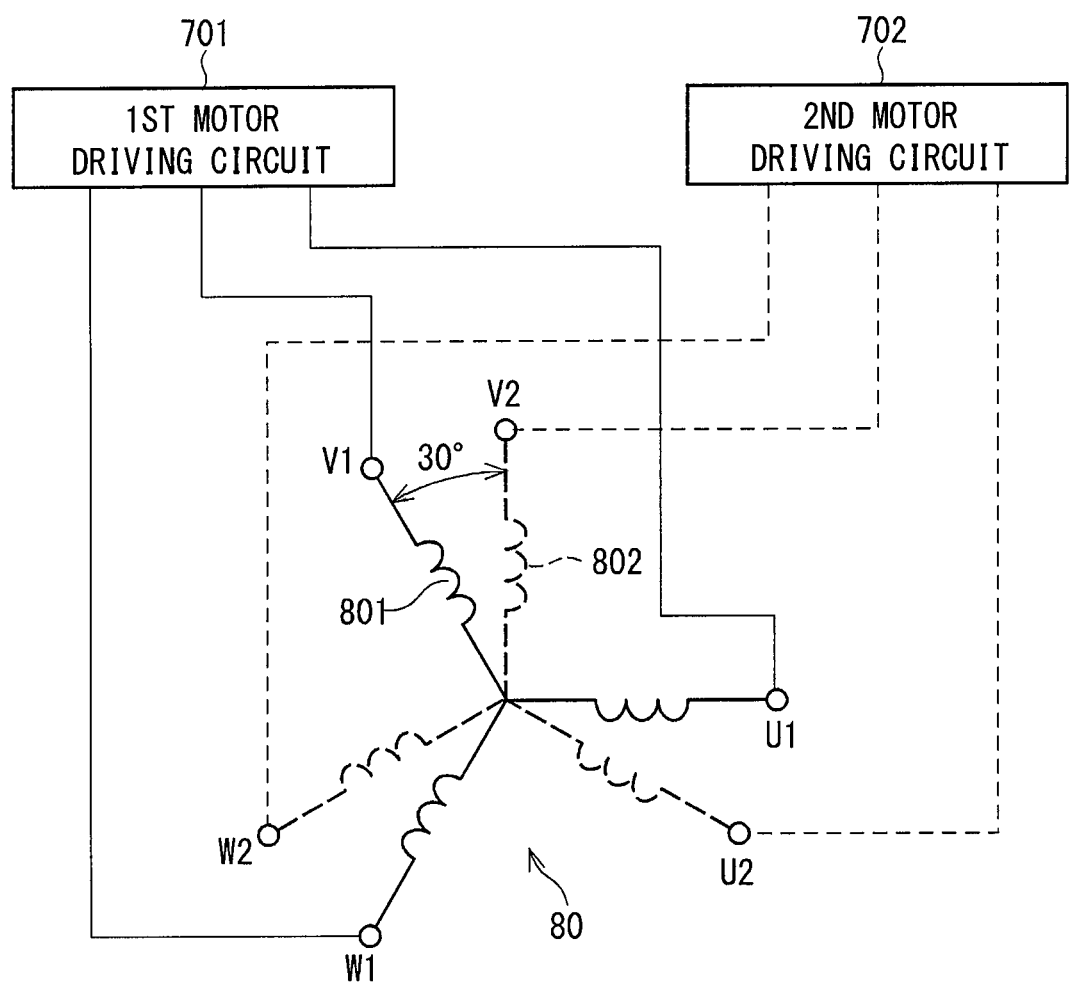
FIG. 5 is a schematic view showing a configuration of a multi-phase coaxial motor.
Figure 6:
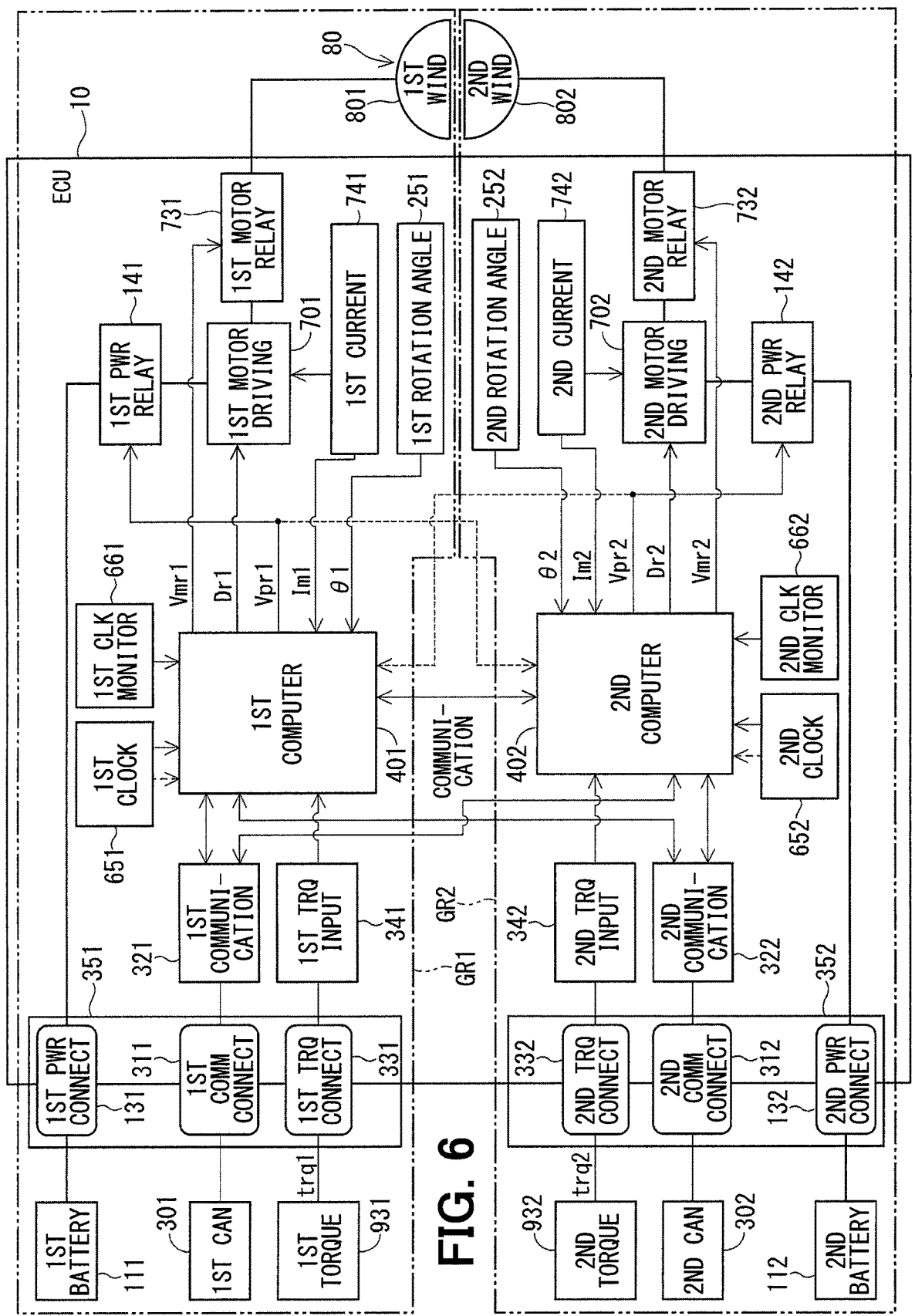
FIG. 6 is an overall configuration diagram of an ECU (motor control apparatus) according to each embodiment.

As shown in FIG. 5 and FIG. 6, the motor 80 to be controlled by the ECU 10 is a three-phase brushless motor which has two pairs of three-phase winding sets 801 and 802 provided coaxially. The winding sets 801 and 802 have the same electrical characteristics and are wound on the common stator core 845 while being shifted from each other by an electrical angle of 30 degrees. For this reason, the winding sets 801 and 802 are controlled so that phase currents having the same amplitude and a phase difference of 30 degrees are supplied.

In FIG. 6, a combination of the first winding set 801, the first computer 401, the first motor driving circuit 701 and the like related to current supply control for the first winding set 801 is defined as a first system group GR1. The other combination of the second winding set 802, the second computer 402, the second motor driving circuit 702 and the like related to current supply control for the second winding set 802 is defined as a second system group GR2. The first system group GR1 and the second system group GR2 are formed of two independent sets of element groups in a fully duplicated system.

In the description, when necessary, "first" and "second" are attached to structural components and signals of the first system group GR1 and the second system group GR2 for distinction. However, when not necessary, "first" and "second" are not attached. Further, the structural components and signals in the first system group GR1 and the second system group GR2 are distinguished with "1" and "2" at the end of the reference numerals, respectively. Hereinafter, for a certain structural component, the system group including such a component is referred to as "one system (subject system)," and another system is referred to as "the other system." Similarly, with respect to the two computers 401 and 402, the computer of the subject system is referred to as a "one computer (subject computer)" and another computer of the other system is referred to as "the other computer."

A first connector unit 351 of the ECU 10 includes a first power supply connector 131, a first vehicle communication connector 311 and a first torque connector 331. A second connector unit 352 includes a second power supply connector 132, a second vehicle communication connector 312 and a second torque connector 332. Each of the connector units 351 and 352 may be formed as a single connector unit or may be separated into a plurality of connector units.

The first power supply connector 131 is connected to a first power supply battery 111 which is a DC battery. Power of the first power supply battery 111 is supplied to the first winding set 801 via the first power supply connector 131, a power supply relay 141, the first motor driving circuit 701 and a first motor relay 731. The power of the first power supply battery 111 is also supplied to the first computer 401 and sensors of the first system group GR1. The second power supply connector 132 is connected to a second power supply battery 112 which is also a DC battery. Power of the second power supply battery 112 is supplied to the second winding set 802 via the second power supply connector 132, a second power supply relay 142, the second motor driving circuit 702 and a second motor relay 732. The power of the second power supply battery 112 is also supplied to the second computer 402 and sensors of the second system group GR2. In case the power supplies are not provided redundantly, the two power supply connectors 131 and 132 may be connected to a common power supply battery.

In case CANs are redundantly provided as a vehicle communication network, the first vehicle communication connector 311 is connected between a first CAN 301 and a first vehicle communication circuit 321 and the second vehicle communication connector 312 is connected between a second CAN 302 and a second vehicle communication circuit 322.

In case CANs are not provided redundantly, the power supply connectors 131 and 132 may be connected to a common CAN 30. As a vehicle communication network other than CAN, a network of any standard such as CAN-FD (CAN with Flexible Data rate) or FlexRay may be used. The vehicle communication circuits 321 and 322 bidirectionally communicate information with the computer 401 of the subject system and the computer 402 of the other system.

The first torque connector 331 is connected between the first torque sensor 931 and a first torque sensor input circuit 341. The first torque sensor input circuit 341 notifies the first computer 401 of the steering torque trq1 detected by the first torque sensor 931. The second torque connector 332 is connected between the second torque sensor 932 and a second torque sensor input circuit 342. The second torque sensor input circuit 342 notifies the second computer 402 of the steering torque trq2 detected by the second torque sensor 932.

Various processes in the computers 401 and 402 may be software processes of a computer program stored in a tangible memory device such as a ROM and executed by a CPU, or may be hardware processes executed by special electronic circuits. The computers 401 and 402 operate based on reference clocks generated by a first clock generation circuit 651 and a second clock generation circuit 652. First and second clock monitor circuits 661 and 662 respectively monitor the reference clocks generated by the clock generation circuits 651 and 652.

The first computer 401 generates a first motor driving signal Dr1 for controlling the operation of the switching elements 241 of the first motor driving circuit 701 and outputs a detected value as an operation command to the first motor driving circuit 701. In addition, the first computer 401 generates a first power supply relay driving signal Vpr1 and a first motor relay driving signal Vmr1. The second computer 402 generates a second motor driving signal Dr2 for controlling the operation of the switching elements 242 of the second motor driving circuit 702 and outputs a detected value as an operation command to the second motor driving circuit 702. In addition, the second computer 402 generates a second power supply relay driving signal Vpr2 and a second motor relay driving signal Vmr2. The power supply relay driving signals Vpr1 and Vpr2 generated by the computers 401 and 402 are notified to the power supply relays 141 and 142, respectively, as well as to other computers.

The computers 401 and 402 are configured to mutually transmit and receive information by inter-computer communication among computers. The computers 401 and 402 mutually transmit and receive current detection values, current command values and the like by way of the inter-computer communication between the computers and drive the motor 80 by cooperation of the first system group GR1 and the second system group GR2. A communication frame of the inter-computer communication includes the current detection value and the like. In addition, a current command value, a current limit value, an update counter, a status signal, a CRC signal which is an error detection value signal, a checksum signal or the like may be included in some cases. It should be noted that the present embodiment is operable regardless of the communication contents of the inter-computer communication. That is, other information may be transmitted and received as required or a part or all of the data described above may not be included.

In case that each computer does not receive signals from the other computer via the inter-computer communication although it receives the power supply relay driving signals Vpr1 and Vpr2 from the other computer, the other computer is determined to be normal and the inter-computer communication between the computers is determined to be abnormal. On the other hand, in case that each computer does not receive the power supply relay driving signals Vpr1 and Vpr2 from the other computer and does not receive the signal from the other computer through the inter-computer communication, the other computer is determined to be abnormal.

The first motor driving circuit 701 is a three-phase inverter having the switching elements 241 and converts electric power to be supplied to the first winding set 801. The switching elements of the first motor driving circuit 701 is controlled to turn on and off based on the motor driving signal Dr1 output from the first computer 401. The second motor driving circuit 702 is also a three-phase inverter having the switching elements 242 and converts electric power to be supplied to the second winding set 802. The switching elements 242 of the second motor driving circuit 702 is controlled to turn on and off based on the motor driving signal Dr2 output from the second computer 402.

The first power supply relay 141 is provided between the first power supply connector 131 and the first motor driving circuit 701 and is controlled by the first power supply relay driving signal Vpr1 output from the first computer 401. When the first power supply relay 141 is in the on-state, current flow between the first power supply battery 111 and the first motor driving circuit 701 is permitted. When the first power supply relay 141 is in the off-state, the current flow between the first power supply battery 111 and the first motor driving circuit 701 is shut off. The second power supply relay 142 is provided between the second power supply connector 132 and the second motor driving circuit 702 and is controlled by the second power supply relay driving signal Vpr2 output from the second computer 402. When the second power supply relay 142 is in the on-state, current flow between the second power supply battery 112 and the second motor driving circuit 702 is permitted. When the second power supply relay 142 is in the off-state, the current flow between the second power supply battery 112 and the second motor driving circuit 702 is shut off.

The power supply relays 141 and 142 in the present embodiment are semiconductor relays such as MOSFETs. In case that the power supply relays 141 and 142 have parasitic diodes such as MOSFETs, it is preferable to provide a reverse connection protection relay (not shown) connected in series so that the parasitic diodes are reverse-connected relative to the power supply relays 141 and 142. Alternatively, the power supply relays 141 and 142 may be mechanical relays.

The first motor relay 731 is provided in a power supply path of each phase between the first motor driving circuit 701 and the first winding set 801 and is controlled by a first motor relay driving signal Vmr1 output from the first computer 401. When the first motor relay 731 is in the on-state, current flow between the first motor driving circuit 701 and the first winging set 801 is permitted. When the first motor relay 731 is in the off-state, the current flow between the first motor driving circuit 701 and the first winging set 801 is shut off. The second motor relay 732 is provided in a power supply path of each phase between the second motor driving circuit 702 and the second winding set 802 and is controlled by a second motor relay driving signal Vmr2 output from the second computer 401. When the second motor relay 732 is in the on-state, current flow between the second motor driving circuit 702 and the second winding set 802 is permitted. When the second motor relay 732 is in the off-state, the current flow between the second motor driving circuit 702 and the second winding set 802 is shut off.

The first current sensor 741 detects a current Im1 which is supplied to each phase of the first winding set 801 and outputs a detected value to the first computer 401. The second current sensor 742 detects a current Im2 which is supplied to each phase of the second winding set 802 and outputs a detected value to the second computer 401. In case the rotation angle sensors 251 and 252 are provided redundantly, the first rotation angle sensor 251 detects an electrical angle θ1 of the motor 80 and output a detected value to the first computer 401. The second rotation angle sensor 252 detects an electrical angle θ2 of the motor 80 and output a detected value to the second computer 402. In case that the rotation angle sensors are not provided redundantly, for example, the electrical angle θ2 of the second system group is calculated by an equation of θ2=θ1+30 based on the electrical angle θ1 of the first system group detected by the first rotation angle sensor 251.

Hereinafter, the configuration and operational effects of the ECU of each embodiment will be described. Description of the respective structural components relating to the dual-system redundancy shown in FIG. 6 is simplified as appropriate.

First Embodiment

Figure 7:
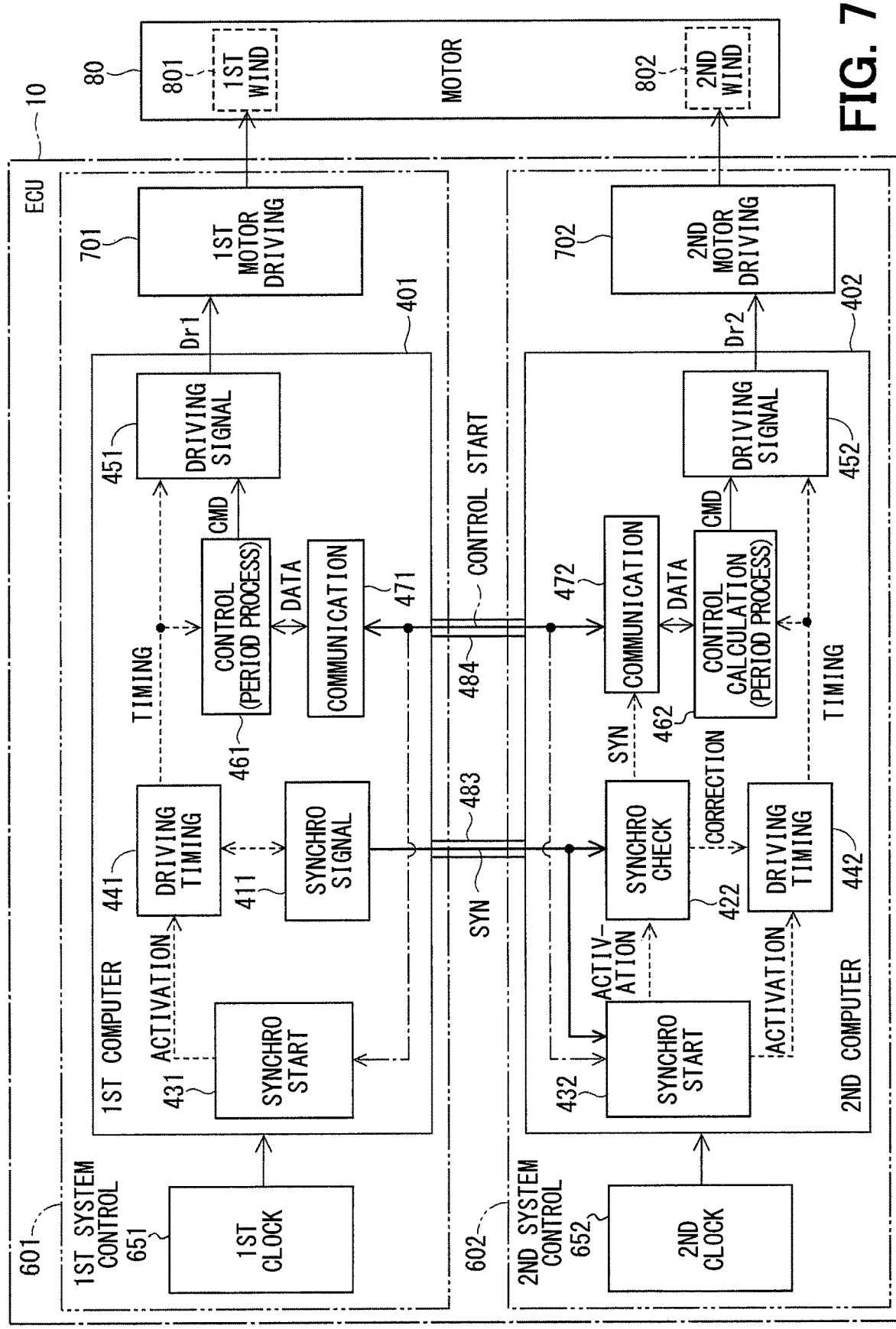
FIG. 7 is an overall configuration diagram of an ECU (motor control apparatus) according to a first embodiment.

The first embodiment will be described with reference to FIG. 1 to FIG. 6. As shown in FIG. 7, the ECU 10 includes a first system group control unit 601 for controlling current supply to the first winding set 801 and a second system group control unit 602 for controlling current supply to the second winding set 802. The control units 601 and 602 of the respective systems include the clock generation circuits 651, 652, computers 401, 402 and motor driving circuits 701, 702. That is, a unit of a group of structural components including the clock generation circuit, the computer and the motor driving circuit form one system.

In this specification, the control performed by a plurality of computers 401 and 402 in synchronization is referred to as coordinate control. The plurality of computers 401 and 402 drive the motor 80 in two systems by coordinate control. When one computer cannot synchronize with the other computer while it is in operation, the control mainly using only the information acquired by the one computer, that is, the control restricting the information acquired from the other computer is referred to as independent control. Typically, this is the control performed while the other computer stops operating while only one computer is operating. In this case, one computer drives the motor 80 in one system. In addition, the independent control includes control in which each computer 401, 402 operates individually in an asynchronous state.

The first clock generation circuit 651 and the second clock generation circuit 652 independently generate reference clocks which the first computer 401 and the second computer 402 use as timing references of operation, respectively. The computers 401 and 402 generate the motor driving signals Dr1 and Dr2 by executing predetermined control calculations based on various input information and output them to the motor driving circuits 701 and 702, respectively. Here, timings of the control calculations are determined based on the clocks generated by the clock generation circuits 651 and 652.

The motor driving circuits 701 and 702 supply currents to the winding sets 801 and 802 based on the motor driving signals Dr1 and Dr2 output as control commands from the computers 401 and 402, respectively. Typically, the motor driving circuits 701 and 702 are power conversion circuits in which a plurality of switching elements such as MOSFETs are bridge-connected. Further, the motor driving signals Dr1 and Dr2 are switching signals for turning on and off each switching element. For example, in the present embodiment in which the three-phase brushless motor is driven, the motor driving circuits 701 and 702 are configured as the three-phase inverters.

Each of the computers 401 and 402 independently has a ROM for storing a control program to be executed by a CPU and fixed values of parameters, a RAM for temporarily storing and holding calculation process results, and cannot refer to the ROM and the RAM of the other computer. On this assumption, the two computers 401 and 402 are connected by a synchronization signal line 483. The number of synchronization signal line 483 is not limited to one and a plurality of synchronization signal lines 483 may be provided.

This synchronization signal line 483 is not limited to a dedicated line for synchronization signal transmission which will be described later, but may be a communication line which is used in common for communication other than a synchronization signal. Such a communication line may be, for example, a clock line used for inter-computer communication or a serial communication line for communicating information such as current. Further, in place of the communication by the synchronization signal line, it is possible to notify the synchronization signal by changing a level of a port signal from the first computer 401 to the second computer 402.

The first computer 401 and the second computer 402 have common configuration, including synchronization start execution sections 431, 432, driving timing generation sections 441, 442, driving signal generation sections 451, 452, control calculation sections 461, 462 and communication sections 471, 472, respectively. The synchronization start execution sections 431 and 432 activate the operations of the driving timing generation sections 441 and 442, respectively.

The driving timing generation sections 441 and 442 generate driving timings, which are pulse timings of the motor driving signals Dr1 and Dr2, by using, for example, a PWM carrier common for each phase, and output commands to the driving signal generation sections 451 and 452 and the control calculation sections 461 and 462, respectively. The driving signal generation sections 451 and 452 compare duties of voltage command signals with the PWM carrier, for example, to generate the motor driving signals Dr1 and Dr2, which are PWM signals, and output driving commands to the motor driving circuits 701 and 702, respectively.

Based on the timing instructions from the driving timing generation sections 441 and 442, the control calculation sections 461 and 462 perform control calculations by a plurality of periodic processes and outputs commands to the driving signal generation sections 451 and 452, respectively. The communication sections 471 and 472 communicate notices for control starts, which will be described later, between the computers 401 and 402 via the signal line 484, for example, respectively. In addition, the communication sections 471 and 472 mutually refer to data with the control calculation sections 461 and 462, respectively. In a second embodiment, which will be described later, communication clock signals communicated between the communication sections 471 and 472 are acquired by the synchronization start execution sections 431 and 432 as indicated by an alternate long and short dashed line.

In addition, the first computer 401 has a synchronization signal generation section 411. In the present embodiment, the first computer 401 functions as a synchronization signal transmission-side computer and the second computer 402 functions as a synchronization signal reception-side computer. For each of the computers 401 and 402, the computer itself (subject computer) is referred to as one computer and the computer other than the one computer is referred to as the other computer.

The synchronization signal generation section 411 of the first computer 401 generates a synchronization signal, which is synchronized with the driving timing generated by the driving timing generation section 441, thereby to synchronize the driving timings of the two computers 401 and 402. Then, the synchronization signal generation section 411 transmits the synchronization signal to the second computer 402 via the synchronization signal line 483. The synchronization signal received by the second computer 402 is acquired by the synchronization check section 422 and the synchronization start execution section 432.

The second computer 402 has the synchronization signal check section 422. The synchronization check section 422 checks whether the synchronization signal is currently received normally and the periodic processes requiring synchronization between the computers 401 and 402 are synchronized. That is, the synchronization check section 422 checks whether a plurality of specific periodic processes is currently in a specific synchronous state in which synchronization is being performed among the specific periodic processes. The synchronization check section 422 is activated by the synchronization start execution section 432 of the second computer 402 and notifies the communication section 472 of the check result about the state of synchronization. Further, the driving timing of the driving timing generation section 442 is corrected based on the check result of the synchronization check section 422.

Here, cycle periods of the plurality of periodic processes of the above-described control calculation sections 461 and 462 are set to a natural multiple of the cycle period of the synchronization signal. For example, in case that the cycle period of the synchronization signal is 200 μs, the cycle periods of the plurality of periodic processes are set to 200 μs (same), 400 μs (two times), 1 ms (five times) and the like. Between the computers 401 and 402, the timings of the plurality of periodic processes are synchronized based on the synchronization signal.

In the conventional apparatus (for example, WO 2016/135840A), a plurality of trigger signals having different cycle periods are generated by a plurality of trigger circuits to synchronize control commands based on the trigger signals. Therefore, it is necessary to increase the number of trigger circuits as the number of periodic processes requiring synchronization increases. It is further necessary to increase the number of the synchronization signals. In the present embodiment, however, the number of the synchronization signals is reduced in a plurality of computers executing a plurality of periodic processes requiring synchronization.

Figure 8:
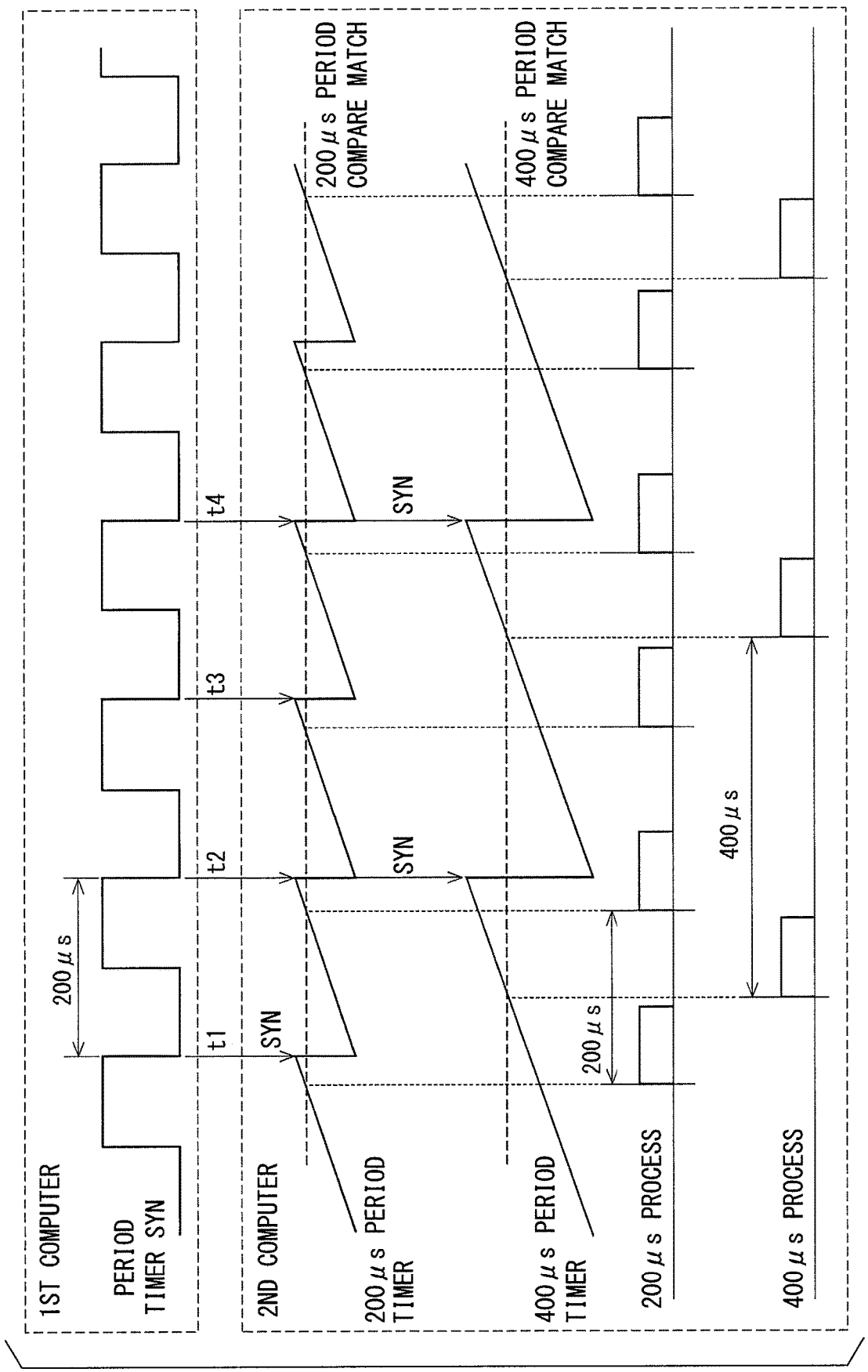
FIG. 8 is a time chart showing an internal operation of a second computer that performs two types of periodic processes.

FIG. 8 shows in particular an internal operation of the second computer 402 which performs two types of periodic processes. A synchronization signal of 200 μs cycle period is transmitted as a pulse signal from the first computer 401 to the second computer 402. In this example, the timing of the falling edge of the synchronization signal is used as a trigger. Hereinafter, the timing of the falling edge of the synchronization signal received by the second computer 402 is referred to as a synchronization signal reception timing.

In the second computer 402, period timers of the cycle period of 200 μs, which is equal to the synchronization signal period, and the cycle period of 400 μs, which is twice the synchronization signal period, operate. Assuming that the reception timings of the synchronization signals are sequentially t1, t2, t3, t4 and so on, the 200 μs period timer is reset at each reception timing of the synchronization signal, that is, at times t1, t2, t3, t4 and so on. The 400 μs period timer is reset once every two times of the synchronization signal reception timings, that is, at times t2 and t4. The timing of the 200 μs cycle period is determined by a compare match between the 200 μs period timer and a predetermined reference value. The timing of the 400 μs cycle period is determined also by a compare match between the 200 μs period timer and a predetermined reference value.

As described above, the plurality of periodic processes are executed at cycle periods different from each other with respect to the cycle period of the synchronization signal, which are different natural numbers from each other. Assuming that "n" and "m" are natural numbers different from each other (n≠m). The 200 μs period process is executed with n=1 and the 400 µs period process is executed with m=2. Among the plurality of periodic processes, the periodic process requiring synchronization among the computers 401 and 402 is referred to as a specific periodic process. Processes that do not require synchronization even in the periodic processes are not included in the specific periodic process.

The first computer 401 determines the cycle period timing of its specific periodic process based on the synchronization signal generated by itself. The second computer 402 determines its cycle period timing of the specific periodic process based on the synchronization signal received from the first computer 401. Therefore, the specific periodic processes of both computers 401 and 402 are executed in synchronization. As described above, in the present embodiment, each timing of the plurality of specific periodic processes is determined based on one synchronization signal.

In case the cycle period of the synchronization signal is 200 µs and three types of periodic processes of 200 µs, 400 µs, 1 ms (1,000 µs) are executed, the 200 µs periodic process synchronizes once per synchronization signal, the 400 µs periodic process is executed once every two synchronization signals and 1 ms periodic process is executed once per five synchronization signals.

Here, when the computers 401 and 402 continue to be in the operation states without temporarily stopping respective operations after both of the computers 401 and 402 have been activated at the same time and the synchronization signal is normally transmitted from the first computer 401 to the second computer 402, this operation state is referred to as a normal operation. A state in which a plurality of specific periodic processes is synchronously executed in the computers 401 and 402 during the normal operation is referred to as a specific synchronous state. It is noted that the periodic processes other than the specific periodic processes need not be synchronized.

Meanwhile, in case one of the computers continues to operate but the other computer temporarily stops the operation, or in case an abnormality occurs in the generation of the synchronization signal or the communication, the synchronization of the specific periodic process is no longer maintained. A state other than such specific synchronous state is referred to as a specific asynchronous state. That is, the specific asynchronous state includes both cases in which both computers 401 and 402 asynchronously execute the specific periodic processes and only one of the computers performs the specific periodic process.

When the computer which has stopped its operation temporarily is reset or when a temporary abnormality of the synchronization signal is recovered, it is required that the plurality of specific periodic processes is re-synchronized and a transition from the specific asynchronous state to the specific synchronization is attained. In the present embodiment, as a means for solving the problem, communication of notice of the control start notifying the timing at which control can be started by a plurality of specific periodic processes is executed. That is, by the control start notice, the transition timing from the specific asynchronous state to the specific synchronous state is notified.

Figure 9:
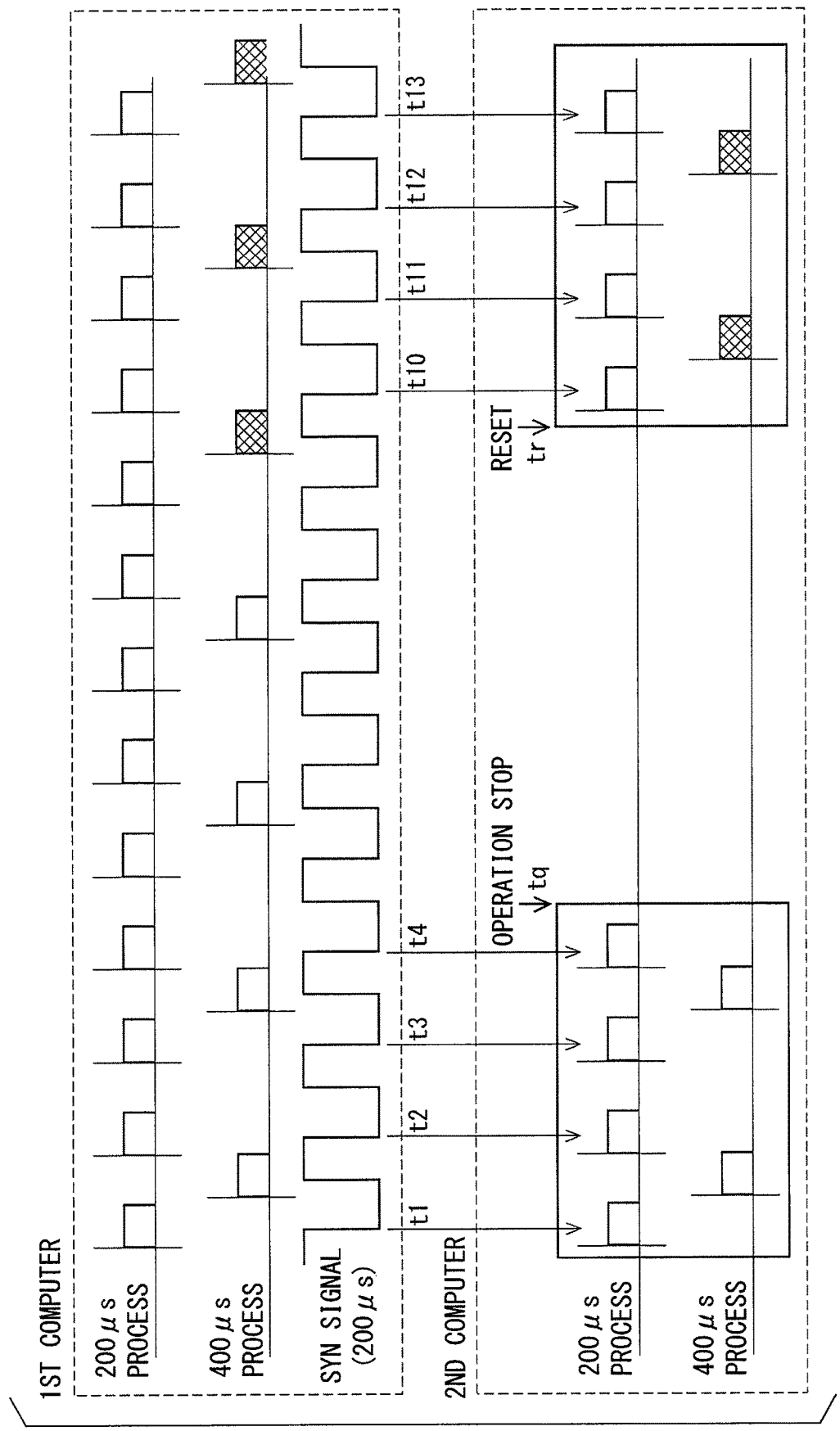
FIG. 9 is a time chart showing periodic process timing after resetting of the second computer according to a comparison example which does not use a control start notice.

FIG. 9 shows a periodic process timing after resetting of the second computer 402 in a comparison example which does not use the control start notice. Before time tq, the timing of the 200 µs periodic process and the 400 µs periodic process of the second computer 402 are determined based on the reception timings t1 to t4 of the synchronization signal. Any of these periodic processes are synchronized with the periodic process of the first computer 401. From time tq to time tr, the second computer 402 stops its operation temporarily while the operation of the first computer 401 continues. After time tr when the second computer 402 is reset, the timing of the 200 µs periodic process and the 400 µs periodic process are determined based on the timing t10 of the first synchronization signal.

After the resetting of the second computer 402, the periodic timings of the first computer 401 and the second computer 402 are always synchronized with the periodic process of 200 µs which is the same as the period of the synchronization signal. However, with respect to the 400 µs periodic process of the doubled period of the synchronization signal, the relative timing with respect to the synchronization signal does not change before and after the operation stop but, after the reset, the 400 µs period timing of the first computer 401 and the 400 µs period timing of the second computer 402 deviate from each other as indicated by cross-hatching in FIG. 9.

Figure 10:
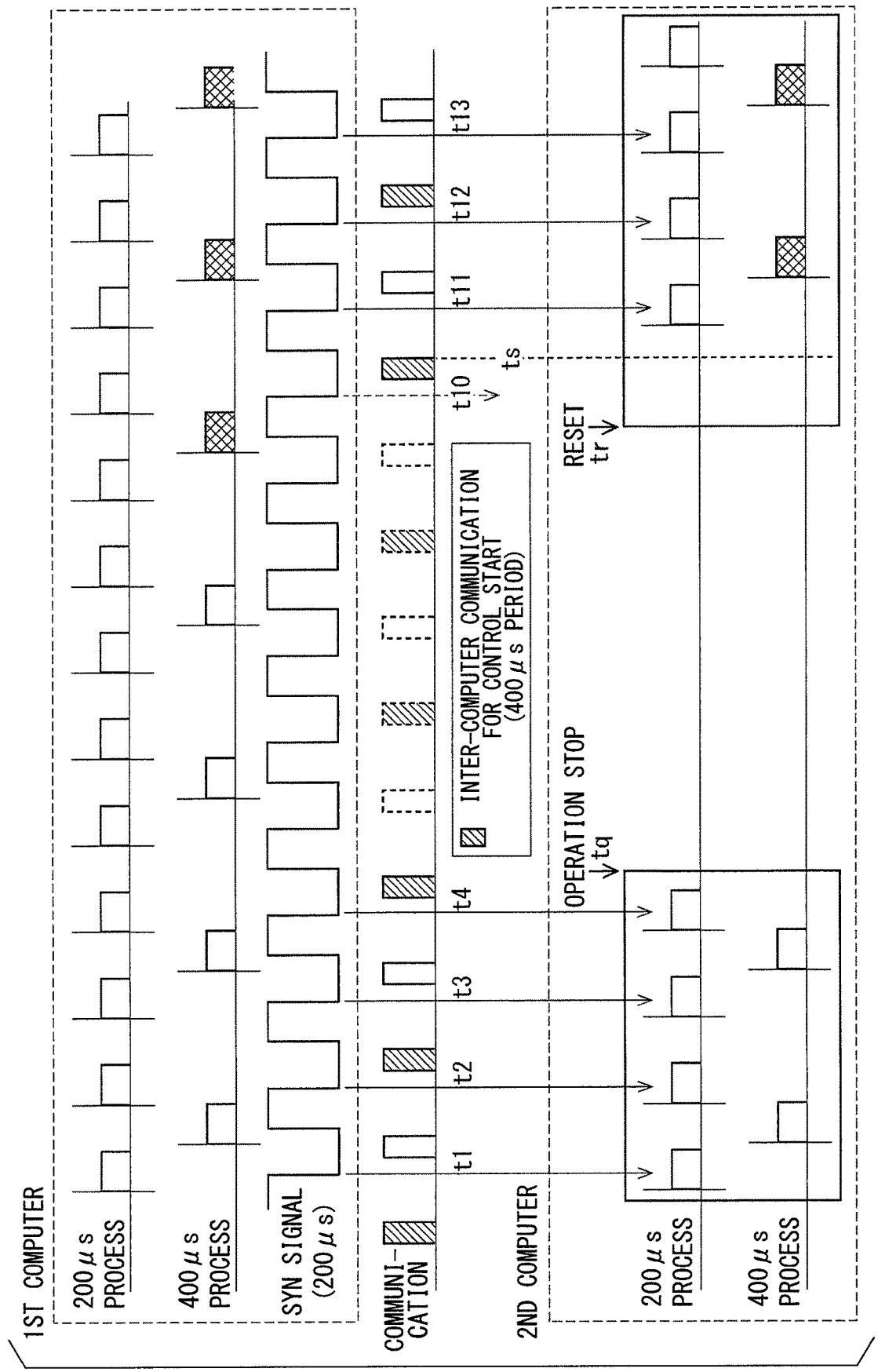
FIG. 10 is a time chart showing periodic process timing after resetting of the second computer according to the first embodiment.

FIG. 10 shows the periodic process timing after resetting of the second computer 402 in the first embodiment described above. In the first embodiment, as indicated by hatching with oblique lines, the inter-computer communication of the control start notice is performed for the re-synchronization. The control start notice is communicated at a cycle period of N times (N≥1) of the 400 µs cycle period which is the least common multiple of 200 µs and 400 µs. That is, the control start notice may be communicated at intervals of 400×N µs, such as 800 µs, 1200 µs, other than 400 µs shown in FIG. 10.

The period of the least common multiple of the cycle period of a plurality of specific periodic processes corresponding to 400 µs in this example is referred to as a common cycle period. In another example, when there are seven cycle periods of 200 µs, 1 ms, 5 ms, 10 ms, 20 ms, 40 ms and 80 ms, the common cycle period is 80 ms. Further, in addition to the above-exemplified case, when there is a specific periodic process of 3 ms period, the common cycle period is 240 ms. In this case, if it is not necessary to synchronize the 3 ms periodic process, it is excluded from the specific periodic process and the common period may be set to 80 ms.

In FIG. 10, the timing of each periodic process before time tq when the operation of the second computer 402 is stopped is the same as in FIG. 9. After time tr when the second computer 402 is reset, the reception timing t10 of the first synchronization signal is before the control start notification. Thus the cycle period timer of the second computer 402 is not started. Then, after the second computer 402 receives the control start notice at time ts, the cycle period timer for starting the specific periodic process is started. Then, the timings of the 200 µs periodic process and the 400 µs periodic process are determined based on the reception timing t11 of the next synchronization signal. As a result, after resetting of the second computer 402, the 400 µs cycle period timing of the second computer 402 is always synchronized with the 400 µs cycle period timing of the first computer 401 without being shifted.

The control start notice may be communicated using the dedicated signal line or may be communicated by the inter-computer communication when performing the inter-computer communications. A counter value which is cleared at a period of N multiple of the common cycle period may be provided to the data for the inter-computer communication so as to notify the start of control.

The control start notice may be communicated at least when transitioning from the specific asynchronous state to the specific synchronous state. That is, the control start notice may be constantly communicated at the cycle period of N multiple of the common cycle period or the communication may be started after the temporary stop of the other computer is detected. As a detection method of temporary stop of the other computer, it is possible to detect that the communication data of the inter-computer communication cannot be received correctly from the partner computer. Other detection methods may alternatively be used. The communication of the synchronization signal is unnecessary while the other computer is stopped. For this reason, even if the communication capacity is used for communication of the control start notice, the controllability is not affected.

Also, the synchronization check section 422 may communicate the control start notice by the inter-computer communication only when it is determined that it is currently in the specific asynchronous state. With this configuration, only the synchronization signal is communicated in the specific synchronous state. It is therefore possible to suppress an increase in the communication capacity caused by the control start notification.

As described above, since the ECU 10 according to the present embodiment determines the timing of a plurality of specific periodic processes of the two computers 401 and 402 based on one synchronization signal, the number of synchronization signals can be reduced. In addition, the ECU 10 of the present embodiment communicates the control start notice with the cycle period of N multiplication of the common cycle period which corresponds to the least common multiple of a plurality of specific periodic processes. As a result, the ECU 10 can properly synchronize the plurality of specific periodic processes at the time of resetting after the other computer is temporarily stopped while the operation of one computer is continuing, or at the time of recovery after occurrence of the synchronization signal abnormality.

Next, with reference to a flowchart of FIG. 11, a control mode switching process at time of resetting a computer will be described. In the following flowchart, symbol S indicates a processing step. Here, for example, the first computer 401 is assumed to be one computer (subject computer), which is programmed to execute the processing shown in FIG. 11, and the second computer 402 is assumed to be the other computer.

In the initial state of S1, the one computer and the other computer drive the motor 80 in two systems by coordinate control. At this time, the computers are in the specific synchronous state in which a plurality of specific periodic processes is executed in a synchronized state.

After that, the one computer continues its operation. On the other hand, when the other computer stops its operation, it is determined to be YES in S2 and S3 is executed. In S3, the ECU 10 switches the control mode from the coordinated control to the independent control by only the one computer, and drives the motor 80 in one system. At this time, the computers are in the specific asynchronous state in which a plurality of specific periodic processes is not executed in synchronization. Subsequently, when the other computer is reset, the one computer transmits the control start notice to the other computer.

When the plurality of specific periodic processes are synchronized again between the one computer and the other computer and the transition from the specific asynchronous state to the specific synchronous state is made, S5 results in YES indicating the re-synchronization and S6 is executed. In S6, the ECU 10 switches the control mode of some control from the independent control to the coordinated control. Thereafter, at a predetermined timing, S7 results in YES and S8 is executed. In S8, the ECU 10 switches the control mode of the remaining control from the independent control to the coordinated control.

Specifically, when S5 results in YES by re-synchronization after resetting, only communication of diagnostic information and the like using the inter-computer communication is returned to the coordinated control, for example. On the other hand, with respect to the other control, only the synchronization of the specific periodic process is performed, and the control contents itself is not returned to the coordinated control while maintaining the independent control itself. For example, by not returning the assist control affecting the steering wheel operation to the coordinated control, it is possible to avoid occurrence of shock to the steering operation.

The predetermined timing of S7 is, for example, a case where an ignition switch is turned on again after being turned off. Also, at the time of non-steering, both computers may be restarted after being stopped. At this time, all the controls executed in the plurality of specific periodic processes including the assist control are executed by the coordinated control.

Second Embodiment

Figure 12:
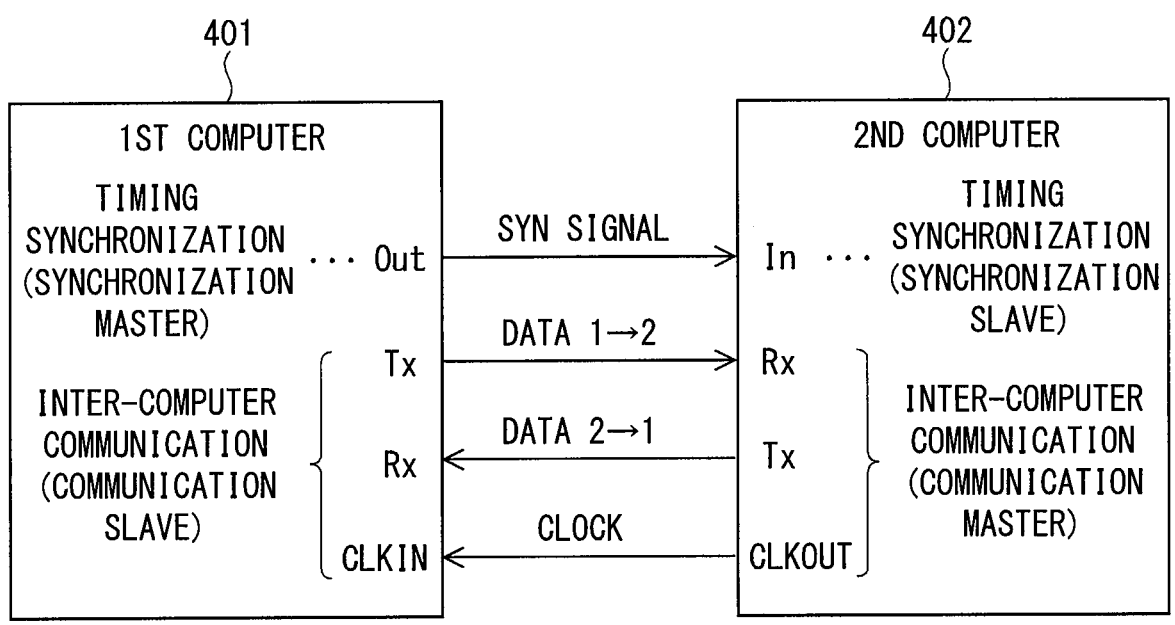
FIG. 12 is a control cycle period synchronization configuration diagram according to a second embodiment.

Next, a second embodiment will be described with reference to FIG. 12 to FIG. 14. FIG. 12 shows a synchronous state of control cycle periods. The synchronization signal is transmitted from an output terminal Out of the first computer 401 which is a synchronization master of timing synchronization to an input terminal In of the second computer 402 which is a synchronization slave of timing synchronization. In addition, the second computer 402 functions as a communication master for the inter-computer communication between the first computer 401 and the second computer 402, and the first computer 401 functions as a communication slave for the inter-computer communication.

Communication data 1→2 is transmitted from a transmission terminal Tx of the first computer 401 to a reception terminal Rx of the second computer 402, and communication data 2→1 is transmitted from the a transmission terminal Tx of the second computer 402 to a reception terminal Rx of the first computer 401. Further, a communication clock serving as a reference for the timing of notification of the control start notice is transmitted from the CLKOUT terminal of the second computer 402 to a CLKIN terminal of the first computer 401.

In a configuration using the inter-computer communication, when the second computer 402, which is the communication master, is reset, the first computer 401, which is the communication slave, stores in an inter-computer communication buffer notification information corresponding to the control start notice at intervals of N multiples of the common cycle period. Then, the first computer 401 waits for the notice from the second computer 402. In this case, the inter-computer communication is insufficient as means for recognizing the synchronization timing. Therefore, as a means for notification from the first computer 401, which is the communication slave, to the second computer 402, which is the communication master, synchronization is realized by using the following information in combination.

First, separately from the inter-computer communication, detailed timing is notified by using the synchronization signal, which is for synchronization timing notification. Then, using the inter-computer communication, the synchronization timing of the specific periodic process is notified. This notification information is updated at the same cycle period as the synchronization signal. For example, in case the notification of the synchronization signal is the timing of the rising edge of a pulse, it is updated during a period from a present rising edge to a next rising edge. Further, in case the notification of the synchronization signal is the timing of the rising edge and a falling edge of the pulse, it is updated during a period from the rising edge to the falling of the pulse.

Based on such a background described above, the synchronization of the control cycle periods are provided as shown in FIG. 12. FIG. 13 and FIG. 14 show an operation of the configuration of the second embodiment. The first computer 401 and the second computer 402 periodically perform the inter-computer communication for the control start notice and the communication of the synchronization signal during the normal operation. The control start notice and the notification information corresponding to the control start notice are indicated by a solid-line hatching. In addition, the communication clock of the second computer 402 is indicated by a broken-line hatching.

Figure 13:
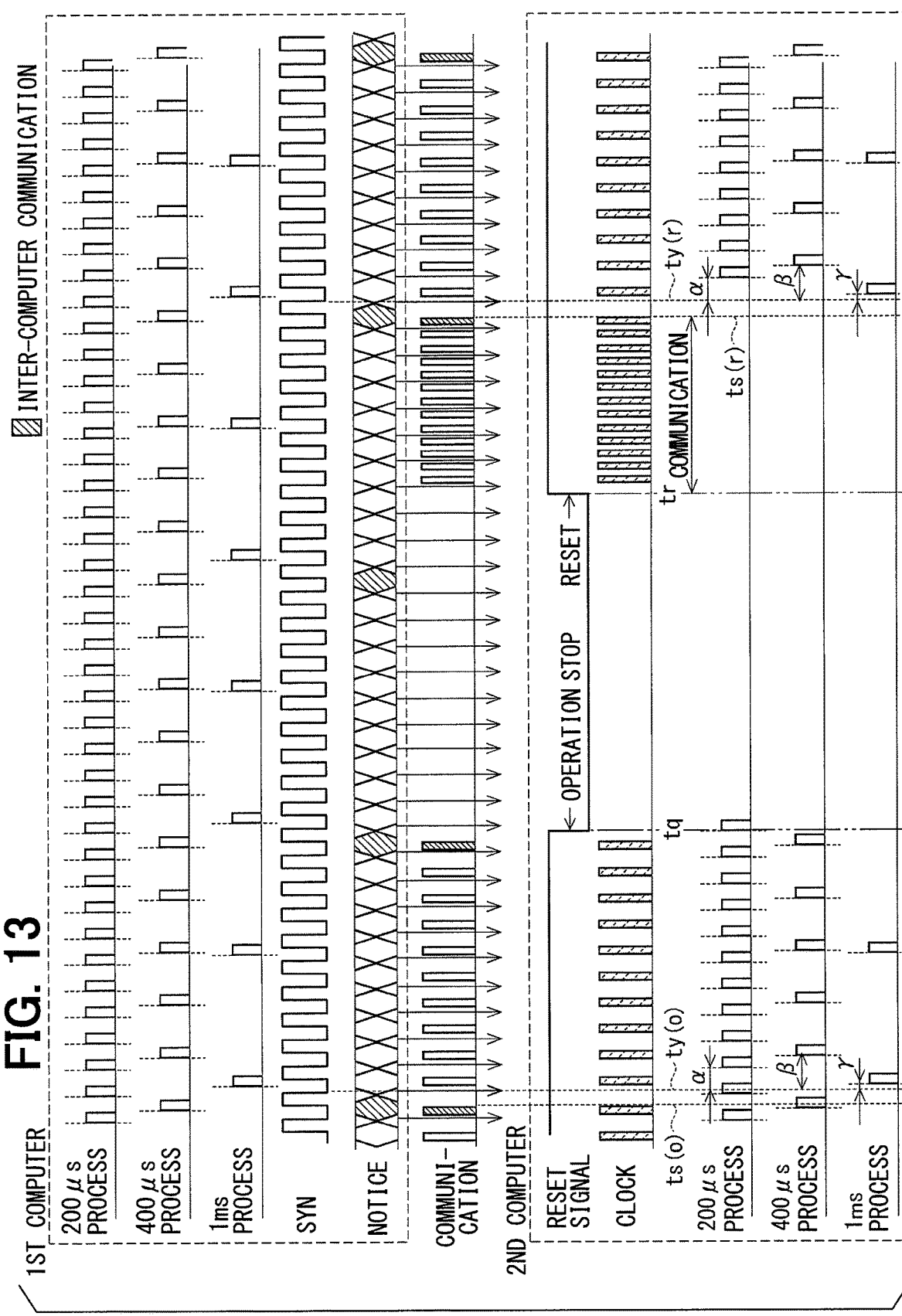
FIG. 13 is a time chart showing timing of each periodic process after resetting of the second computer in the second embodiment.

In FIG. 13, a synchronization signal reception timing next to a communication timing ts(o) of the control start notice is assumed to be ty(o). The 200 μs period process, the 400 μs period process and the 1 ms period process by the second computer 402 are started after delay periods α, β and γ from the synchronization signal reception timing ty(o) as a reference, respectively. The second computer 402 is reset at time tr after stopping its operation once at time tq.

The second computer 402 transmits the communication clock to the first computer 401 during a period from the reset time tr to the reception timing ts(r) of the next control start notice. At this time, if the transmission of the communication clock is later than the notification information update period of the first computer 401, it is likely to occur that the first computer 401 fails to acquire the communication clock at the time of updating the notification information. Therefore, it is preferable that the second computer 402 transmits the communication clock at a shorter cycle period than the cycle period in which the first computer 401 updates the notification information.

After the reception time ts(r) of the control start notice, the second computer 402 activates each periodic process timer with reference to the reception time ty(r) of the next synchronization signal, and starts a plurality of specific periodic processes. However, since it is only necessary for the second computer 402 to uniquely determine the timing at which each periodic process timer is activated, it is not limited to the next reception time of the synchronization signal but may be based on the synchronization signal reception time which is after the next and subsequent times.

Figure 14:
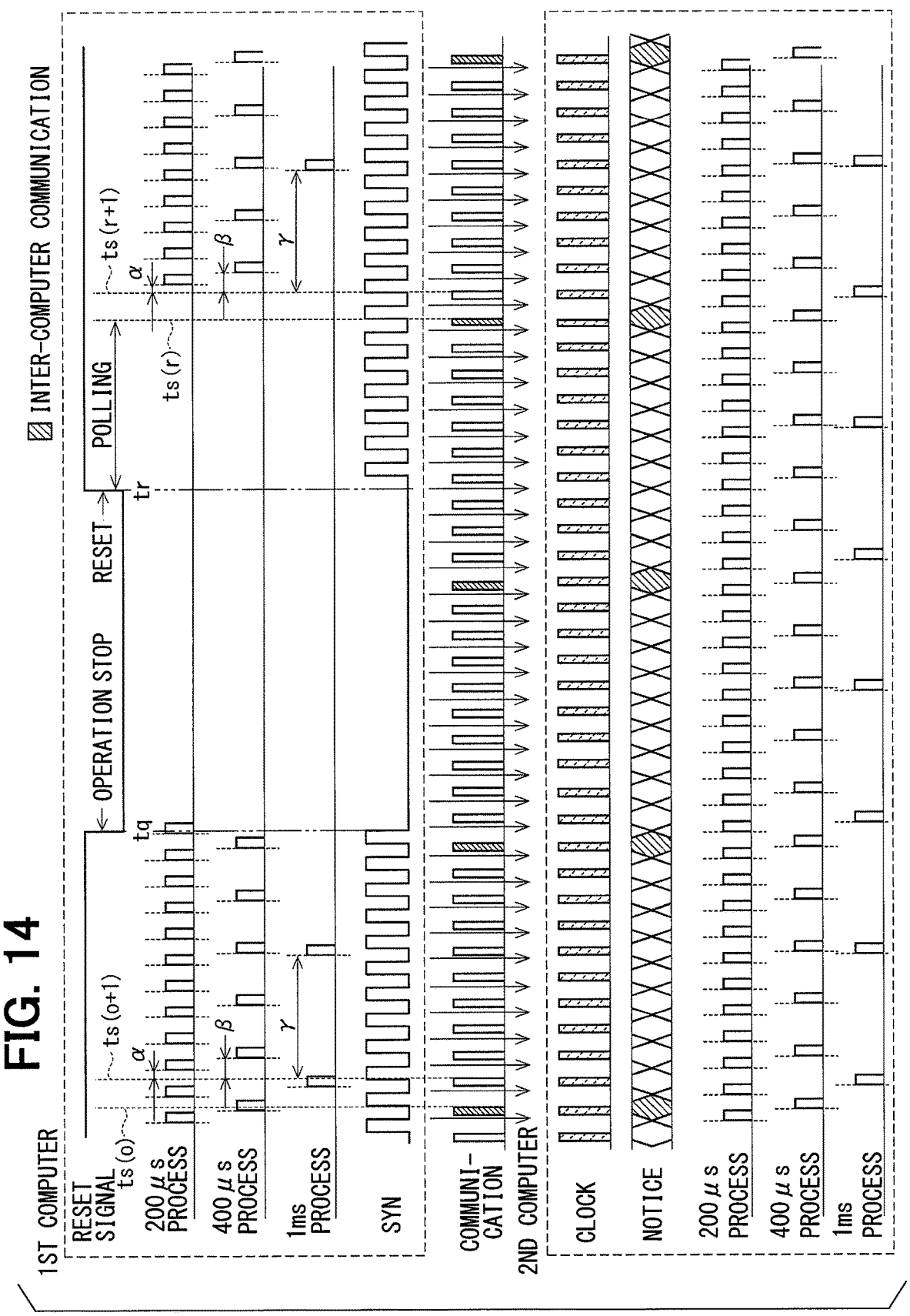
FIG. 14 is a time chart showing timing of each periodic process after resetting of the first computer in the second embodiment.

In FIG. 14, the communication timing next to the communication time ts(o) of the control start notice is assumed to be ts(o+1). The 200 μs periodic process, the 400 μs periodic process and the 1 ms periodic process by the first computer 401 are started after delay periods α, β and γ from the communication time ts(o+1) as a reference, respectively. The first computer 401 is reset at time tr after stopping its operation at time tq.

The first computer 401 waits for the notice during a period from the reset time tr to the reception time ts(r) of the next control start notice, that is, performs polling. After the reception time ts(r) of the control start notice from the second computer 402, the first computer 401 activates each periodic process timer with reference to the communication time ts(r+1) of the next inter-computer communication, and starts a plurality of specific periodic processes. However, since it is only necessary for the first computer 401 to uniquely determine the timing at which each periodic process timer is activated, it is not limited to the next communication time but may be based on the communication time which is after the next and subsequent times.

Figure 11:
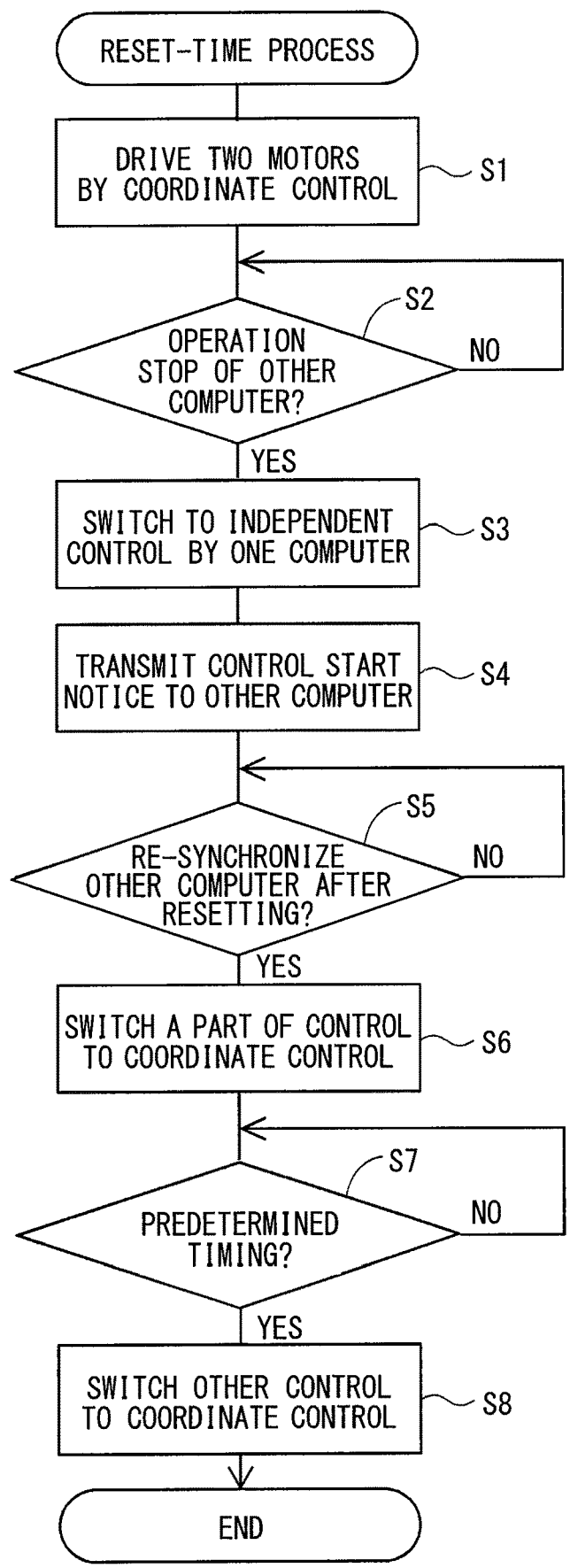
FIG. 11 is a flowchart showing a control switching process executed at computer reset time.

Other Embodiment (A) In the above-description, FIG. 11 shows one example in which, during a period of continued operation of one computer, the other computer is reset after stopping of its operation. However, this process is not limited to the case where the reset operation is performed, but may be applied to all cases where the operation is resumed after the computers cannot be synchronized for any reason. Therefore, a case that the other computer temporarily stops its operation corresponds to a case that one computer cannot be synchronized with the other computer. In addition, resetting corresponds to resumption of operation or re-synchronization.

(B) As described above, the independent control is a control performed by primarily using only information acquired by itself while limiting use of information acquired from other computers. That is, even in case of the independent control, some information acquired from other computers may be used in some cases. For example, when it is not possible to synchronize with other computers, the one computer may operate by acquiring information of other computers acquired asynchronously through an external route of the ECU such as CAN. In this case, each computer 401, 402 operates individually in the asynchronous state and performs the independent control.

(C) In contrast to the above-described embodiments, in case that the timing of the plurality of specific periodic processes in each computer 401, 402 is only determined based on one synchronization signal, the computers 401 and 402 need not communicate the control start notice at a period of N multiple of the common period among the specific periodic processes. As a result, the number of synchronization signals can be reduced at least as compared with the conventional apparatus.

When switching a part of the control of S6, which is executed at the computer reset time shown in FIG. 11, it is conceivable that only the control executed in the 200 μs period process equal to the synchronization signal period is switched to the coordinate control. In that case, since it is not necessary to synchronize the specific periodic processes of other periods, the computers 401 and 402 need not communicate the control start notice at a period of N multiple of the common period of each specific periodic processes.

(D) The motor 80 to be controlled in the above-described embodiments is a multiple winding motor in which two pairs of winding sets 801 and 802 are arranged on a common stator while being shifted from each other by the electrical angle of 30 degrees. As another embodiment, two or more sets of winding sets may be arranged in the same phase in the motor to be controlled. Further, the motor configuration is not limited to a configuration of two or more sets of windings arranged on the common stator. For example, a plurality of motors, each of which has respective winding sets wound on respective stators, may jointly output a torque. In addition, the number of phases of the multi-phase brushless motor is not limited to three phases but may be four or more phases. Further, the motor to be driven is not limited to the AC brushless motor but may be a DC motor with brush. In that case, an H-bridge circuit may be used as a motor driving circuit.

(E) The motor control apparatus described above may include three or more computers. For example, the synchronization signal may be transmitted from one computer provided at a synchronization signal transmission side to a plurality of other computers provided at a synchronization signal reception side. Alternatively, as another configuration of an ECU including three computers, for example, a synchronization signal may be transmitted from the first computer to the second computer and another synchronization signal is transmitted from the second computer to a third computer. In this configuration, the second computer functions as the synchronization signal reception-side computer relative to the first computer and the second computer functions as a synchronization signal transmission-side computer in relation to the third computer. That is, a plurality of computers may be provided in a chain-connected configuration.

Even in the configuration having three or more computers, the timing of a plurality of specific periodic processes can be determined based on one synchronization signal as in the above-described embodiments. In addition, by communicating the control start notice at a period of N multiplies of the common cycle period corresponding to the least common multiple of the plurality of specific periodic processes, it is possible to synchronize the plurality of specific periodic processes appropriately at the time of resetting after the other computer is temporarily stopped while the operation of one computer is continued or at the time of recovery after the occurrence of synchronization signal abnormality.

(F) The motor control apparatus is not limited to the motor for the electric power steering apparatus, but may be applied to motors for any other applications.

The present disclosure should not be limited to the embodiments described above, and various other embodiments may be implemented without departing from the scope of the present disclosure.

What is claimed is:

1. A motor control apparatus comprising:
a plurality of motor driving circuits for driving at least one motor;
a plurality of computers each of which includes a driving signal generation section and a driving timing generation section, the driving signal generation section generating a motor driving signal and outputting a command to each motor driving circuit, and the driving timing generation section generating a driving timing which is a pulse timing of the motor driving signal; and
a plurality of clock generation circuits for independently generating clocks serving as references for operations of the plurality of computers, wherein
at least one of the plurality of computers is set as a transmission-side computer, which is programmed to operate in synchronization with the driving timing thereof, and generate and transmit a synchronization signal for synchronizing driving timings of the plurality of computers, and at least another one of the plurality of computers is set as a reception-side computer, which is programmed to receive the synchronization signal transmitted from the transmission-side computer;
the transmission-side computer and the reception-side computer are programmed to execute a plurality of specific periodic processes to perform control calculations and output commands to the plurality of motor driving circuits to drive the at least one motor, the specific periodic processes being synchronized based on the synchronization signal and executed at cycle periods of different natural number multiples of a cycle period of the synchronization signal; and
the transmission-side computer and the reception-side computer are programmed to determine each timing of the plurality of specific periodic processes based on the synchronization signal.

2. The motor control apparatus according to claim 1, wherein:
the transmission-side computer and the reception-side computer are programmed to execute and not execute the plurality of specific periodic processes synchronously in a specific synchronous state and in a specific asynchronous state, respectively; and
one of the transmission-side computer and the reception-side computer is programmed to transmit a control start notice to the other of the transmission-side computer and the reception-side computer a control start notice at least at time of switching from the specific asynchronous state to the specific synchronous state at a cycle period of N multiple (N≥1) of a common cycle period corresponding to a minimum common multiple of the cycle periods of the specific periodic processes, the control start notice indicating timing to be able to start controlling by the plurality of specific periodic processes.

3. The motor control apparatus according to claim 2, further comprising:
a dedicated signal line for transmitting the control start notice from the transmission-side computer to the reception-side computer.

4. The motor control apparatus according to claim 2, wherein:
each of the computers is programmed to communicate the control start notice through inter-computer communication.

5. The motor control apparatus according to claim 4, wherein:
the reception-side computer is programmed to check whether the operation state is the specific synchronous state at present; and
the reception-side computer is programmed to communicate the control start notice when a check result of the operation state indicates the specific synchronous state.

6. The motor control apparatus according to claim 2, wherein:
the reception-side computer is programmed to transmit a communication clock as a reference of the timing of the control start notice to the transmission-side computer.

7. The motor control apparatus according to claim 6, wherein:
the reception-side computer is programmed to transmit the communication clock at a cycle period shorter than a cycle period of updating notification information corresponding to the control start notice received by the transmission-side computer.

8. The motor control apparatus according to claim 2, wherein:
the reception-side computer is programmed to start the plurality of specific periodic processes based on a reception timing of the synchronization signal as a reference after receiving the control start notice from the transmission-side computer.

9. The motor control apparatus according to claim 2, wherein:
the transmission-side computer is programmed to start the plurality of specific periodic processes based on a communication timing of the inter-computer communication as a reference after receiving the control start notice from the reception-side computer.

10. The motor control apparatus according to claim 2, wherein:
one computer of the transmission-side computer and the reception-side computer is programmed to switch, when the one computer is not synchronized with the other computer of the transmission-side computer and the reception-side computer during a continued operation of the one computer and is in the specific asynchronous state, a control mode from a coordinate control, which is executed by the one computer and the other computer, to an independent control, which is executed by only the one computer.

11. The motor control apparatus according to claim 10, wherein:
the one computer is programmed to transmit the control start notice to the other computer for re-synchronization with the one computer when the other computer restores an operation thereof after temporarily stopping the operation thereof.

12. The motor control apparatus according to claim 11, wherein:
the one computer is programmed to switch at least a part of control thereof from the independent control to the coordinate control, when the other computer changes an operation state thereof from the specific asynchronous state to the specific synchronous state after restoring the operation thereof.

13. The motor control apparatus according to 12, wherein:
the one computer is programmed to further switch a remaining part of the control thereof from the independent control to the coordinate control at a predetermined timing after switching the at least a part of control from the independent control to the coordinate control.

14. The motor control apparatus according to claim 1, wherein:
one computer of the transmission-side computer and the reception-side computer is programmed to switch a control mode thereof from a coordinate control, which is executed by the one computer and the other computer of the transmission-side computer and the reception-side computer, to an independent control, which is executed by only the one computer, when the one computer is not synchronized with the other computer during a continued operation of the one computer and is in the specific asynchronous state; and
the one computer is programmed to switch only a control which is executed by the specific periodic processes of an equal cycle period as that of the synchronization signal from the independent control to the coordinate control, when the one computer and the other computer are synchronized again after switching of the control mode to the independent control.

15. The motor control apparatus according to claim 1, further comprising:
a synchronization signal line connecting the transmission-side computer and the reception-side computer to communicate the synchronization signal.

16. A motor driving system comprising:
the motor control apparatus according to claim 1; and
the motor formed as a brushless motor having a plurality of multi-phase winding sets which are provided coaxially and supplied with current by the motor control apparatus.

17. A motor driving system comprising:
the motor control apparatus according to claim 1 and applied to an electric power steering system; and
the motor driven by the motor control apparatus and outputting an assist torque.

18. A motor control apparatus comprising:
a plurality of motor driving circuits for driving at least one motor;
a plurality of computers each of which includes a driving signal generation section and a driving timing generation section, the driving signal generation section generating a motor driving signal and outputting a command to each motor driving circuit, and the driving timing generation section generating a driving timing which is a pulse timing of the motor driving signal; and
a plurality of clock generation circuits for independently generating clocks serving as references for operations of the plurality of computers, wherein
at least one of the plurality of computers is set as a transmission-side computer, which operates in synchronization with the driving timing thereof and generates and transmits a synchronization signal for synchronizing driving timings of the plurality of computers, and at least another one of the plurality of computers is set as a reception-side computer, which receives the synchronization signal transmitted from the transmission-side computer;
the transmission-side computer and the reception-side computer execute a plurality of specific periodic processes to perform control calculations and output commands to the plurality of motor driving circuits to drive the at least one motor, the specific periodic processes being synchronized based on the synchronization signal and which are to be executed at cycle periods of different natural number multiples of a cycle period of the synchronization signal; and
each timing of the plurality of specific periodic processes is determined based on the synchronization signal.

* * * * *